(12) United States Patent
DiFoggio

(10) Patent No.: US 8,792,307 B2
(45) Date of Patent: Jul. 29, 2014

(54) ACOUSTIC TRANSDUCER WITH A BACKING CONTAINING UNIDIRECTIONAL FIBERS AND METHODS OF MAKING AND USING SAME

(75) Inventor: Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 433 days.

(21) Appl. No.: 13/030,263

(22) Filed: Feb. 18, 2011

(65) Prior Publication Data

US 2011/0205841 A1 Aug. 25, 2011

Related U.S. Application Data

(60) Provisional application No. 61/306,721, filed on Feb. 22, 2010.

(51) Int. Cl.
*G10K 11/00* (2006.01)
*G01V 1/00* (2006.01)
*G01V 1/50* (2006.01)

(52) U.S. Cl.
CPC ............. *G10K 11/002* (2013.01); *G01V 1/50* (2013.01)
USPC ............ 367/162; 367/176; 367/35; 310/327; 310/326; 310/328

(58) Field of Classification Search
CPC ......... A61B 8/00; A61B 8/4455; G10K 11/02
USPC ..................... 367/162, 176, 35; 310/326, 327
See application file for complete search history.

(56) References Cited

U.S. PATENT DOCUMENTS

| | | | |
|---|---|---|---|
| 4,439,497 A | 3/1984 | DiFoggio | |
| 4,499,770 A | 2/1985 | Kriz | |
| 4,523,122 A | 6/1985 | Tone et al. | |
| 4,528,652 A | 7/1985 | Horner et al. | |
| 4,616,152 A | 10/1986 | Saito et al. | |
| 4,658,649 A | 4/1987 | Brook | |
| 4,779,244 A | 10/1988 | Horner et al. | |
| 5,418,759 A | 5/1995 | Fiebiger et al. | |
| 5,648,941 A | 7/1997 | King | |
| 6,043,590 A | 3/2000 | Gilmore | |
| 6,104,126 A * | 8/2000 | Gilmore | 310/334 |
| 7,257,489 B2 | 8/2007 | Hsu et al. | |

(Continued)

OTHER PUBLICATIONS

Grewe, Martha G. et al., Acoustic Properties of Particle/Polymer Composites for Ultrasonic Transducer Backing Applications, IEEE Transaction on Ultrasonics, Ferroelectrics, and Frequency Control, vol. 37, No. 6, Nov. 1990, pp. 506-514.

(Continued)

*Primary Examiner* — Isam Alsomiri
*Assistant Examiner* — Hovhannes Baghdasaryan
(74) *Attorney, Agent, or Firm* — Cantor Colburn LLP

(57) ABSTRACT

The disclosure, in one aspect, provides an apparatus that includes an acoustic transducer and a backing in contact with a side of the transducer. The backing includes substantially unidirectional fibers in a matrix of a material that has high shear wave acoustic attenuation. The fibers contact the side of the transducer at an angle configured to convert substantially all of the compressional waves that enter the backing for the transducer into shear waves, which shear waves are then attenuated by the matrix of the backing material.

16 Claims, 3 Drawing Sheets

(56) References Cited

U.S. PATENT DOCUMENTS

| | | |
|---|---|---|
| 7,880,368 B2* | 2/2011 | Sawada et al. ............... 310/334 |
| 2002/0084720 A1 | 7/2002 | Riedel |
| 2004/0095847 A1* | 5/2004 | Hassan et al. .................. 367/25 |
| 2009/0213690 A1 | 8/2009 | Steinsiek et al. |

OTHER PUBLICATIONS

Kondo, Toshio, et al., "Composite Materials and Measurement of Their Acoustic Properties," The Japan Society of Applied Physics, 2004, pp. 2914-2915.

Kondo, Toshio et al., "Broad Band Ultrasonic Transducers using Carbon Fiber Composites for a Backing Material," IEEE Ultrasonics Symposium, 2006, pp. 1537-1540.

Nguyen, N.T. et al., "Highly attenuative rubber modified epoxy for ultrasonic transducer backing application," Ultrasonics 34, (1996), pp. 669-675.

Ramadas, S. N. et al., "Tapered transmission line technique based graded matching layers for thickness mode piezoelectric transducers," Ultrasonics Symposium (IUS), IEEE, Sep. 20-23, 2009, Rome, pp. 1695-1698.

Zimmer, J. E. et al., "Determination of the Elastic Constants of a Unidirectional Fiber Composite Using Ultrasonic Velocity Measurements," The Journal of the Acoustical Society of America, 1969, pp. 795-803.

International Preliminary Report on Patentability dated Sep. 7, 2012 for International Application No. PCT/US2011/025703; all references cited above.

\* cited by examiner

ACOUSTIC TRANSDUCER WITH A BACKING CONTAINING UNIDIRECTIONAL FIBERS AND METHODS OF MAKING AND USING SAME

CROSS REFERENCES TO RELATED APPLICATIONS

This application claims priority from the U.S. Provisional Patent Application having the Ser. No. 61/306,721 filed Feb. 22, 2010.

BACKGROUND INFORMATION

1. Field of the Disclosure

This disclosure relates to acoustic sensors having high acoustic attenuation backings, methods of making such sensors and using same in acoustic tools for downhole well logging and other applications.

2. Description of Prior Art

Typical downhole acoustic and ultra acoustic logging tools utilize one or more acoustic transducers to generate acoustic signals in a wellbore (or borehole). The frequency of a typical transducer is in the ultrasonic range, generally 100 kHz or more. Acoustic frequencies in this range are used to achieve better resolution in the confined space of a wellbore. Acoustic transducers often utilize piezoelectric active elements in ceramic or metallic enclosures. Such transducers often transmit acoustic signals through the wellbore fluid into the earth formation surrounding the borehole. Various acoustic receivers in the tool sense acoustic signals reflected from the formation. Such received signals are processed to determine a property of interest of the formation and/or the borehole wall or of the wellbore fluid, itself. A backing is typically placed on the back side of the transducer to attenuate acoustic signals impinging on such side to reduce the ringing effect and to reduce reflections from the back side of the transducer so that a clean signal, consisting of only acoustic waves that emanate from the front of the transducer, are launched into the medium with which it is in contact. The main acoustic design criteria for a backing material are: (i) to minimize acoustic reflection at the backing-transducer interface by matching, as closely as possible, the acoustic impedance of the backing material to the acoustic impedance of the transducer and (ii) to minimize the return of any acoustic waves to that interface once they have entered the backing material through the use of acoustic scattering to many other directions or through the use of acoustic absorption. Typically, acoustic transducer backing materials are constructed of a solid matrix, usually an epoxy or another polymer filled with solid particle fillers such as tungsten, micro balloons, etc., that act as acoustic scatterers to different directions to reduce the return of acoustic waves to the backing-transducer interface. Such backings often do not effectively attenuate all or substantially all the compressional waves received at the interface between the transducer and the backing.

The disclosure herein provides transducers with backings that improve attenuation or attenuate substantially all compressional waves that are transmitted into the backing from the back side of the transducer.

SUMMARY

One embodiment of the disclosure is an apparatus that includes an acoustic transducer and a backing in contact with a side of the transducer. The backing includes substantially unidirectional fibers in a material with high shear wave acoustic attenuation. The fibers contact the side of the transducer at an angle configured to convert substantially all of the compressional waves that enter the backing into shear waves, which shear waves are attenuated by the matrix of the backing.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The present disclosure is best understood with reference to the accompanying figures in which like numerals refer to like elements and in which.

DESCRIPTION OF ILLUSTRATIVE EMBODIMENTS

Figure 1:
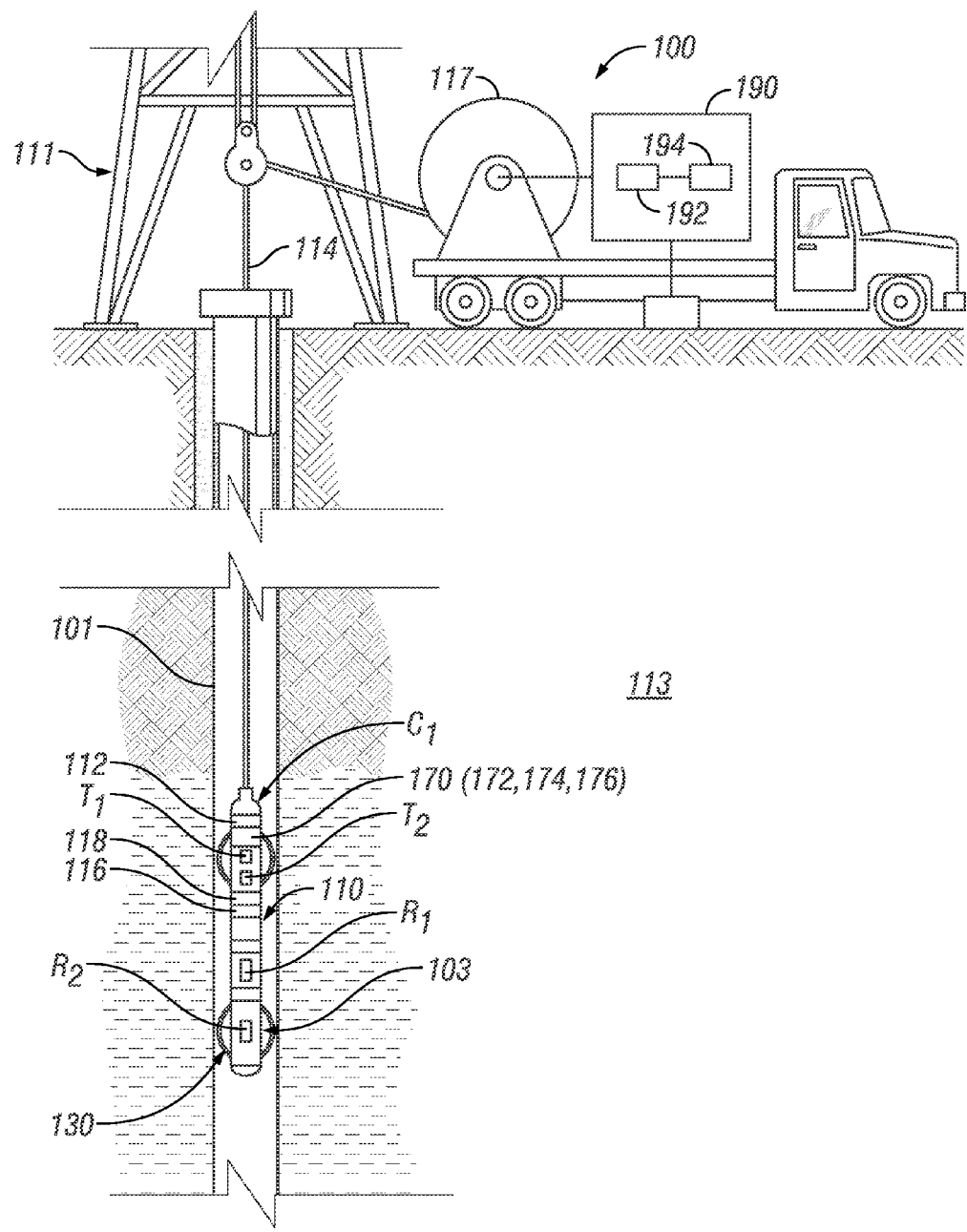
FIG. 1 shows an acoustic well logging tool configured to utilize acoustic transducers described herein.

FIG. 1 shows a schematic illustration of an exemplary well logging system 100. System 100 is shown to include a logging instrument or tool 110 conveyed into a wellbore or borehole 101 formed in an earth formation 113. The tool 110 may be conveyed into the wellbore 101 by any suitable member 114, such as an electrical armored cable (also referred to as "wireline"), a slick line, a coiled-tubing, etc. The conveying member 114 may be spooled on a winch 117 or similar device known in the art. The conveying member 114 may be conveyed into the wellbore 101 using a platform or rig 115 at the surface. The conveying member 114 is electrically connected at one end to a surface control unit 190 and at the other end to the tool 110. The control unit 190 may be a computer-based system configured to process data or signals provided by the tool 110 to estimate one or more parameters of interest send command signals to various components of the tool 110 and generally control the operation of the tool 110. The control unit 190 includes a processor 192, a data storage device 194 and programs to process data and control the operations of the tool 110. The control unit 110 may also include a display unit and peripherals to enter data and to provide a human interfaced. A telemetry system 112 may be used to establish bi-directional data communication between the tool 110 and the controller 190. The control unit 190 and the tool 110 also may respectively include a signal decoding and interpretation units 198 and 116 and recording units 194 and 118. The tool 110 also may include a control unit 170, which may further include a processor 172 (such as microprocessor), data storage device 174, such a solid-state memory, and computer programs 176 configured to be used by the processor 172 for executing instructions contained in such programs 176. The signals transmitted by the tool 110 to the surface control unit 190 and the signals transmitted by the control unit 190 to the tool 110 are decoded, interpreted, recorded and processed by their respective control units.

Still referring to FIG. 1, the tool 110 is further shown to include exemplary transmitters T1 and T2 made according to one embodiment of the disclosure, as described in more detail in reference to FIGS. 2-6. A transmitter circuit TC1 causes the transmitters T1 and T2 to transmit acoustic signals into the earth formation 113. Receivers R1 and R2 receive acoustic signals reflected by the earth formation 113 in response to the transmitted signals. A suitable electrical circuit RC1 conditions the received signals and the control unit 170 processes such conditioned signals. The tool 110 shown in FIG. 1 illustrates an exemplary wireline tool that provides information for determining or estimating a parameter of interest or property of the formation 113, such as acoustic porosity, bed boundary location, etc. In another aspect or configuration, the tool 110 may utilize transducers on a member 130, which transducers are placed proximate to or in contact with the borehole wall 103 for imaging the borehole wall 103. For the purpose of this disclosure, any acoustic tool that utilizes a transducer made according to an embodiment described herein may be utilized for estimating a property of interest. Additionally, it should be noted that although FIG. 1 shows a wireline acoustic tool, the tool 110 may be a measurement-while-drilling acoustic tool (also referred to a logging-while-drilling tool) for estimating a parameter or property of interest during drilling of a wellbore. For drilling applications, the tool may be a part of a drilling assembly that is conveyed by a jointed-tubular or a coiled-tubing. The telemetry for such application may include any suitable telemetry method, including, but not limited to, mud pulse telemetry, electromagnetic telemetry; wireless telemetry; and wired-pipe telemetry.

Figure 2:
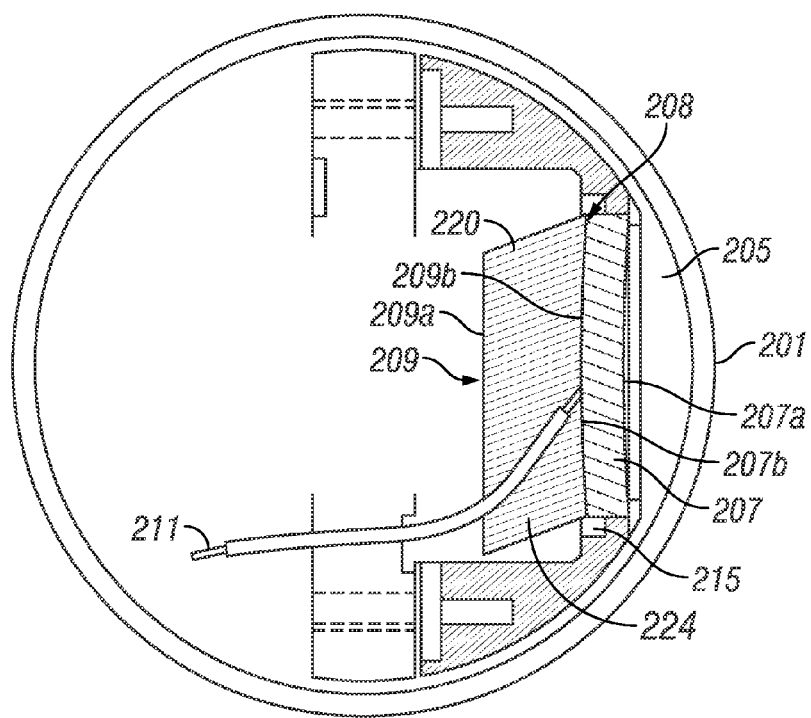
FIG. 2 is a schematic diagram of an exemplary transducer made according to one embodiment of the disclosure.

FIG. 2 shows a cross-section of an exemplary transducer assembly 200 made according to one embodiment of the disclosure. The transducer assembly 200 includes a transducer a 207 and a window 201 made from a suitable material, such as polytetrafluoroethylene, which is sold under the trade name Teflon®. The transducer 207 transmits signals from its front side 207a through the window 201 into a formation through the fluid in the wellbore. Alternatively, the transducer 207 may be mounted on a member, such as an extendable arm, that causes the transducer 207 or the transducer assembly 200 to extend proximate to or contact the wellbore wall. In one aspect, the space between the front side 207a of the transducer 207 and the window 201 may be filled with a suitable material 205, such as oil. In one aspect, the acoustic impedance of transducer 207 is matched to filled or unfilled polytetrafluoroethylene, which is not to be construed as a limitation and any other material with a desired abrasion resistance and acoustic properties may be utilized for the purpose of this disclosure.

Still referring to FIG. 2, the transducer assembly 200 also includes a backing (or an acoustic attenuator) 209 having a front side 209a and a back side 209b. The back side 209b of the backing 209 is placed in contact with the back side 207b of the transducer 207. The transducer 207 and the backing 209 may be coupled to each other at the interface 208 by any suitable device 215, such as clamps. A suitable epoxy or an adhesive also may be utilized to couple the backing 209 to the transducer 207. Suitable leads 211 may be utilized to couple the transducer 207 to an electrical circuit, such as one using a transformer coil, to energize the transducer to transmit acoustic signals at a selected frequency. The backing 209 is configured to attenuate acoustic signals propagating from to the transducer side 207b and to reduce reflections from the interface 208 between the transducer 207 and backing 209. In one aspect, the backing 209 may be made of aligned fibers 220 embedded in a matrix material 224 having high shear wave attenuation. The aligned fibers 220 may contact the interface 208 at a suitable angle, A. In one aspect, the angle A may be above a critical angle that transforms all or substantially all compressional waves arriving at the interface 208 into shear waves. The shear waves are then attenuated by the matrix material 224. The acoustic impedance of a homogenous material is its density times its sound speed. However, this anisotropic backing material has anisotropic acoustic impedance. Its acoustic impedance at the interface is its density times the component of its sound speed that is perpendicular to the interface. Therefore, its interface acoustic impedance (for the purpose of calculating the reflection intensity of acoustic waves at normal incidence to that interface) depends on the angle of the fibers relative to the interface and can be adjusted to provide a better match to the transducer by varying the angle of the fibers relative to the interface. In one aspect, the adjustment to the angle is in a range of angles that exceeds the critical angle so that, in addition to minimizing reflections from that interface, all compressional waves that enter the backing material are converted to shear waves.

Figure 3:
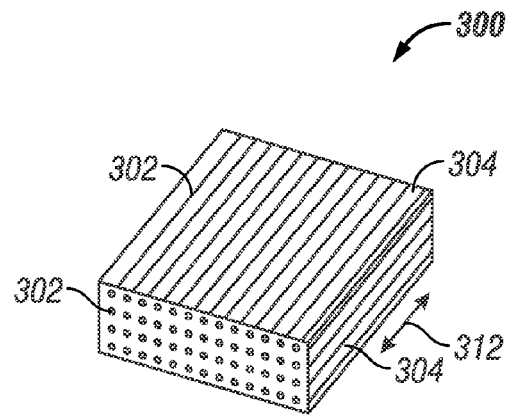
FIG. 3 shows an isometric view of a backing for acoustic transducers, according to one embodiment of the disclosure.

FIG. 3 shows an isometric view of a backing 300 for use with acoustic transducers, according to one embodiment of the disclosure. The backing 300 includes a matrix material (also referred to as the base material) 302 and aligned fibers 304 embedded in the matrix material 302. The backing 300 is shown in a rectangular form for ease of explanation. The backing 300 may be formed in any suitable shape and size with unidirectional fibers. The fibers 304 are unidirectional, meaning they (and their axes) are substantially oriented along a common direction, such as direction 312. In one embodiment, the fibers 304 may be coated with the matrix material and then closely packed or held together to form the backing 300. In another configuration, fiber 304 may be embedded in the matrix material 302. Any other suitable method may be utilized to form the backing 300. In one aspect, the ends of the fiber may be exposed to make a physical contact with a transducer side or surface. The fibers 304 are made from a material that has a compressional wave sound speed far greater than the matrix sound speed. In one aspect, the fibers are tungsten wires. Any other suitable material that has a compressional wave sound speed much higher (about 3 to 15 times higher) than the matrix sound speed may also be utilized. The matrix material has a high shear wave attenuation, such as polytetrafluoroethylene, which is sold under the trade name Teflon®, and which, according to different references, has a shear wave attenuation between 59 db/inch at 1 MHz and 300 db/inch. Other suitable materials include, but are not limited to, silicone rubber, or chlorosulfonated polyethylene, which is sold under the trade name Hypalon® and/or a combination of one or more other materials. Polytetrafluoroethylene has a compressional sound speed of approximately 1380 m/sec whereas epoxies have sound speeds between approximately 2820 and 3090 m/sec. Generally, most other polymers have sound speeds between these limits. There, however, are certain polymers (for example, poly(p-phenylene-2,6-benzobisoxazole) abbreviated PBO, sold under the trade name of Zylon®, that have a sound speed range of 13,397-15,199 m/sec). In one aspect, such polymers are sufficiently stiff that they may be suitable for making the fibers for the purpose of this disclosure. It is noted that carbon fibers have sound speeds between 11,600 and 21,200 m/sec and tungsten has a sound speed of 4290 m/sec.

Figure 4:
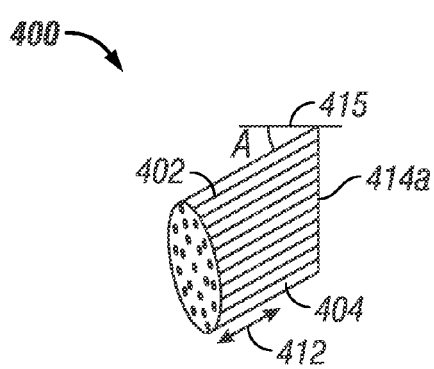
FIG. 4 shows an isometric view of a backing for acoustic transducers, according to another embodiment of the disclosure.

FIG. 4 shows an isometric view of a backing 400 for use with acoustic transducers, according to another embodiment of the disclosure. Often, acoustic transducers have a circular back side. The configuration of backing 400 is circular with unidirectional fibers 404 placed along an axial or longitudinal direction 412. A face 414a of the backing 400 is cut at a suitable angle A to the plane 415. The face 414a is configured to contact flush with the back side of a transducer. The backing 400 may be made in the manner described in reference to backing 300 shown in FIG. 3.

Figure 5:
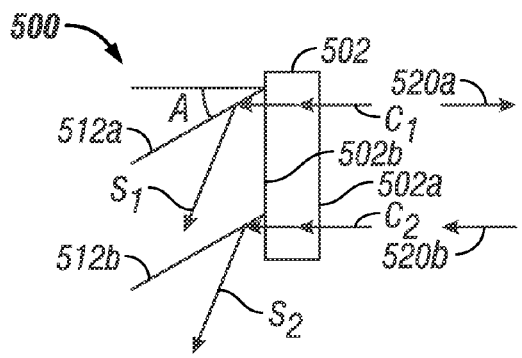
FIG. 5 shows a partially assembled transducer with a backing made according to one embodiment of the disclosure.

FIG. 5 show a behavior of compressional waves entering a backing with fibers at an angle to a side of a transducer. FIG. 5 shows a transducer 502 having a front side 502a and a back side 502b. Exemplary fibers 512a and 512b in a backing 510 interface with the side or face 502b at an angle A relative to a plane perpendicular to the transducer 502. When the transducer 502 is activated to transmit acoustic signals in the direction 520a, compressional waves, such as C1 and C2, travel to the back side 502b of the transducer along a direction 520b, which directional is substantially perpendicular to the face 502b. The compressional waves C1 and C2 interact with the fibers 512a and 512b, respectively, and are converted to shear waves S1 and S2 respectively, which shear waves are attenuated by the matrix material 514. Thus, in aspects, a transducer assembly constructed according to one embodiment of this disclosure may enable attenuation of all or substantially all compressional waves entering a side of a transducer.

Figure 6:
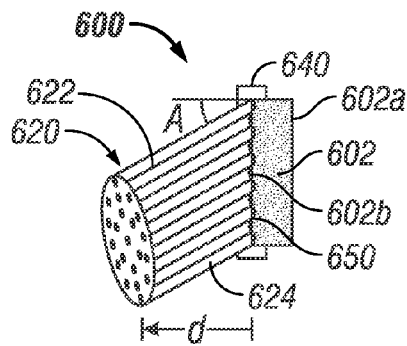
FIG. 6 illustrates transformation of compressional waves to shear waves for attenuation in the backing materials placed on a side of a transducer.

FIG. 6 shows a partial assembly 600 that includes a transducer 602 with a substantially round side 602b coupled to a conforming side 620b of a backing 624. The transducer 602 and backing 620 may be coupled by a suitable coupling device 640 (such as a mechanical coupling device) and/or an epoxy or a resin 650. The backing 620 may be made as described in reference to FIG. 4. The backing 620 is cut at one side 620b at an angle A so that the angle A at the interface between the transducer 602 and backing 620 will be above the critical angle at which all or substantially all compressional waves will be converted to shear waves. The side 620b is shaped to contact a desired area of the side 602b of the transducer. In one aspect, the side 620b may conform to the transducer side 602b or it may be larger or smaller than the side 602b. The backing side 620b is coupled to the transducer side 602b so that the fibers 622 couple to the side 602b of the transducer above the critical angle. In another aspect, a suitable epoxy or resin 650 may be used to provide an interface between the backing side 620b and the fibers 622, with the transducer body. The configuration shown in FIG. 6, in aspects, may convert all or substantially all compressional waves that enter the backing material into shear waves by unidirectional fibers 622, which shear waves are attenuated by the backing's matrix material 624. The thickness "d" of the backing 620 may be selected for optimal performance of the transducer 602. The angle A may be adjusted for optimal performance during assembly of the backing with the transducer and testing of such combination. In aspects, the backing 620 made according to this disclosure may be made comparatively thin. In one aspect the backing thickness may be less than about 2 cm.

The perpendicular acoustic impedance of the backing 620 is the product of the average density of the matrix material 624 and the average speed of the sound perpendicular to the face 620b, which speed depends on the angle A of the oriented fibers to the face 620b. The acoustic impedance of the face 620b of the backing 620 in contact with the transducer 602 may be adjusted continuously by adjusting during assembly and testing to the angle at which the face 620b is cut relative to the direction of the oriented fibers 622. Furthermore, beyond a critical angle A (of approximately 15 degrees) of the oriented fibers, all or substantially all compressional waves that enter the backing material 620b are converted into shear waves. By choosing a matrix material such as polytetrafluoroethylene, the size and number (density) of unidirectional fibers, all or substantially all sound waves that enter the backing 620 beyond the critical angle may be strongly attenuated.

Thus, in one aspect, the disclosure provides an apparatus that includes an acoustic transducer and a backing in contact with a side of the transducer. The backing includes unidirectional or substantially unidirectional fibers in a matrix material with high shear wave acoustic attenuation. The fibers may contact the side of the transducer at an angle configured to convert all or substantially all the compressional waves that enter the backing material for the transducer into shear waves, which shear waves, are then attenuated by the backing's matrix material. In one aspect, the angle is above a critical angle of incidence of the compressional waves to the transducer side that will cause all or substantially all compressional waves that enter the backing material to be converted into shear waves. In one aspect, the angle is about 15 degrees. In one configuration, the backing is in the form of a plate with unidirectional fibers placed at a selected angle relative to the side. In another configuration, the backing may conform to a transducer outer surface, which may be of any shape or form, including circular shape, oval shape, etc. In one aspect, the backing includes fibers embedded in the matrix material. In another aspect, the fibers may be coated with the matrix material and packed or held together to form the backing. In one aspect, the fibers are tungsten wires and the matrix material is Teflon. In another aspect, the acoustic impedance of the transducer substantially matches perpendicular acoustic impedance of the backing at the interface between the backing and the transducer. In another aspect, a window is provided between the transducer. In another aspect, the space between the window and the transducer may be filled with a suitable material, such as oil. In yet another aspect, a pressure compensation mechanism may be provided for the transducer for operation in a wellbore environment.

In another aspect, the disclosure provides a method, which in aspects may include: providing an acoustic transducer; and coupling a backing to a side of the transducer, wherein the backing includes unidirectional or substantially unidirectional fibers in a matrix material with high shear wave acoustic attenuation. In one aspect, the method may further include coupling the backing to the transducer with the fibers at an angle configured to convert all or substantially all the compressional waves that enter the backing material for the transducer into shear waves. The method may include attenuating the shear waves by the matrix material. In one aspect, the angle is above a critical angle of incidence of the compressional waves to the transducer side that causes all or substantially all compressional waves that enter the backing material to convert into shear waves. In one aspect, the angle is about 15 degrees. In another aspect, the method may include coupling the backing to the transformer by a mechanical device. In another aspect, the method may include coupling the backing to the transducer by an epoxy or a resin. In another aspect, the method may include providing pressure compensation to the transducer. In another aspect, the method may include providing a protective window for the transducer and placing a material between the window and the transducer. In another aspect, the method may include placing oil or a rubber material of appropriate or selected acoustic impedance in the space between the window and the transducer.

The foregoing disclosure is directed to certain specific embodiments and method for ease of explanation. Various changes and modifications to such embodiments, however, will be apparent to those skilled in the art. All such changes and modifications are considered to be a part of this disclosure and within the scope of any appended claims.

The invention claimed is:

1. An apparatus comprising:
   an acoustic transducer; and
   a backing coupled to a side of the transducer at an interface, the backing including unidirectional fibers aligned along a common longitudinal axis, the unidirectional fibers contacting the interface so that the longitudinal axis is at a selected angle with respect to a plane perpendicular to the interface, wherein the selected angle is selected to be at or above a critical angle of incidence at which compressional waves arriving at the interface are converted to shear waves for absorption by the backing.

2. The apparatus of claim 1, wherein the critical angle of incidence is about 15 degrees.

3. The apparatus of claim 1 further comprising a processor configured to process signals provided by the transducer to determine a property of interest of an earth formation.

4. The apparatus of claim 1, wherein the unidirectional fibers are tungsten wires embedded in a matrix material of the backing.

5. The apparatus of claim 1, wherein an acoustic impedance of the acoustic transducer substantially matches a perpendicular acoustic impedance of the backing at the interface between the backing and the transducer.

6. The apparatus of claim 1, wherein the backing includes packed fibers coated with a matrix material.

7. The apparatus of claim 1, wherein the acoustic transducer is pressure compensated for use in a wellbore.

8. An apparatus comprising:
   a tool configured for logging a wellbore, the tool comprising:
      an acoustic transducer configured to receive acoustic waves from an earth formation and provide signals responsive to the received acoustic waves, and
      a backing coupled to a side of the acoustic transducer at an interface, the backing including unidirectional fibers in a matrix, wherein the unidirectional fibers are aligned along a common longitudinal axis and contact the interface so that the longitudinal axis is at a selected angle with respect to a plane perpendicular to the interface, wherein the selected angle is selected to be at or above a critical angle of incidence at which compressional waves received at the interface are converted to shear waves for absorption by the matrix; and
   a processor configured to process the signals provided by the acoustic transducer to determine a property of interest.

9. The apparatus of claim 8, wherein an acoustic impedance of the acoustic transducer substantially matches a perpendicular acoustic impedance of the backing at the interface between the backing and the acoustic transducer.

10. A method of determining a parameter of interest, comprising:
    transmitting acoustic waves into a formation from a tool deployed in a wellbore;
    receiving acoustic waves from the formation responsive to the transmitted acoustic waves at a transducer in the tool;
    providing signals responsive to the received acoustic waves by the transducer;
    converting compressional waves at the transducer into shear waves by a backing coupled to a side of the transducer at an interface, the backing including unidirectional fibers aligned along a common longitudinal axis, the unidirectional fibers contacting the interface so that the longitudinal axis is at a selected angle with respect to a plane perpendicular to the interface, wherein the selected angle is at or above a critical angle of incidence at which compressional waves arriving at the interface are converted to shear waves for absorption in a matrix of the backing; and
    processing the signals provided by the transducer using a processor to determine the property of interest.

11. The method of claim 10, wherein the critical angle of incidence is about 15 degrees.

12. The method of claim 10, wherein the backing is coupled to the transducer by one of: a mechanical device, an epoxy, and a resin.

13. The method of claim 10 further comprising pressure compensating the transducer.

14. The method of claim 10 further comprising substantially matching an acoustic impedance of the transducer to a perpendicular acoustic impedance of the backing at an interface between the backing and the transducer.

15. The method of claim 10 further comprising providing a protective window for the transducer and placing a material having a selected acoustic impedance between the window and the transducer.

16. The method of claim 10, wherein the backing includes packed fibers coated with a matrix material.

* * * * *